(12) United States Patent
Muthiah

(10) Patent No.: US 11,915,047 B2
(45) Date of Patent: Feb. 27, 2024

(54) MANAGING STORAGE DEVICE COMPUTE OPERATIONS

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 382 days.

(21) Appl. No.: 16/917,544

(22) Filed: Jun. 30, 2020

(65) Prior Publication Data
US 2021/0406070 A1 Dec. 30, 2021

(51) Int. Cl.
*G06F 3/06* (2006.01)
*G06F 9/48* (2006.01)

(52) U.S. Cl.
CPC .......... *G06F 9/4887* (2013.01); *G06F 3/0604* (2013.01); *G06F 3/0659* (2013.01); *G06F 3/0673* (2013.01); *G06F 9/485* (2013.01)

(58) Field of Classification Search
CPC .... G06F 9/4887; G06F 3/0604; G06F 3/0659; G06F 3/0673; G06F 9/485
See application file for complete search history.

(56) References Cited

U.S. PATENT DOCUMENTS

| | | | | |
|---|---|---|---|---|
| 6,216,169 B1 * | 4/2001 | Booman | ............... | H04L 43/065 |
| | | | | 709/246 |
| 7,631,023 B1 * | 12/2009 | Kaiser | ..................... | G06F 16/10 |
| | | | | 711/170 |
| 8,156,561 B2 | 4/2012 | Mimatsu et al. | | |
| 8,346,735 B1 * | 1/2013 | Tang | ................... | G06F 11/1474 |
| | | | | 707/675 |
| 8,516,232 B2 | 8/2013 | Dolgunov et al. | | |
| 10,389,800 B2 | 8/2019 | Blainey et al. | | |

(Continued)

FOREIGN PATENT DOCUMENTS

| | | |
|---|---|---|
| CA | 2559588 A1 | 9/2006 |
| EP | 3110072 B1 | 8/2017 |

OTHER PUBLICATIONS

U.S. Appl. No. 16/359,662 entitled "Solid State Drive Latency Estimation Interface for Host Performance Tuning".

(Continued)

*Primary Examiner* — Emerson C Puente
*Assistant Examiner* — Jonathan R Labud
(74) *Attorney, Agent, or Firm* — PATENT LAW WORKS LLP

(57) ABSTRACT

Example storage systems, storage devices, and methods provide novel management of storage device compute operations using intermediate results, such as approximate or partial results, to optimize processing flow. An example system has a storage medium and a storage controller coupled to the storage medium that is configured to evaluate a processing capability of a storage device and determine, based on the processing capability, that only a portion of a multi-stage compute operation is completable within a requested processing timeframe. The storage processor may further be configured to determine and provide an intermediate result, which may include an approximation or a partial result of the multi-stage compute operation. The intermediate result may be used by a client to manage its own processing while it awaits a final processing result.

20 Claims, 8 Drawing Sheets

(56) References Cited

U.S. PATENT DOCUMENTS

| | | |
|---|---|---|
| 2005/0102479 A1 | 5/2005 | Innan et al. |
| 2005/0240742 A1 | 10/2005 | Eng et al. |
| 2006/0026319 A1* | 2/2006 | Rothman .......... G06F 11/1469 714/E11.13 |
| 2007/0067584 A1 | 3/2007 | Muto |
| 2009/0172333 A1 | 7/2009 | Marcu et al. |
| 2010/0169603 A1 | 7/2010 | Perry |
| 2013/0268807 A1 | 10/2013 | Spencer et al. |
| 2014/0075112 A1* | 3/2014 | Baptist ............ G06F 3/0689 711/114 |
| 2014/0258910 A1 | 9/2014 | Liang et al. |
| 2014/0325519 A1 | 10/2014 | Li et al. |
| 2015/0199148 A1* | 7/2015 | Hrischuk .......... G06F 11/3485 711/114 |
| 2015/0381436 A1 | 12/2015 | Jackson |
| 2016/0085465 A1 | 3/2016 | Schmier et al. |
| 2017/0091114 A1* | 3/2017 | Gold ............ G06F 11/1456 |
| 2017/0115891 A1 | 4/2017 | O'Krafka et al. |
| 2018/0046395 A1 | 2/2018 | Sekimoto |
| 2018/0107719 A1 | 4/2018 | Albrecht et al. |
| 2018/0183891 A1 | 6/2018 | Zhang et al. |
| 2018/0227238 A1 | 8/2018 | Buban |
| 2018/0359308 A1 | 12/2018 | Davies et al. |
| 2019/0026031 A1 | 1/2019 | Kachare et al. |
| 2019/0334801 A1* | 10/2019 | Dutta ............ G06K 9/6223 |
| 2019/0391761 A1 | 12/2019 | Brief et al. |
| 2020/0050404 A1 | 2/2020 | Kim |
| 2020/0142619 A1 | 5/2020 | Ke |
| 2020/0234007 A1 | 7/2020 | Vainas et al. |
| 2020/0241795 A1 | 7/2020 | Yang et al. |
| 2020/0301606 A1 | 9/2020 | Muthiah |
| 2020/0344084 A1 | 10/2020 | Shribman et al. |
| 2021/0081266 A1 | 3/2021 | Kem et al. |
| 2021/0405924 A1 | 12/2021 | Muthiah et al. |

OTHER PUBLICATIONS

International Search Report and Written Opinion for International Application No. PCT/US2021/016365, dated May 27, 2021, 10 pgs.

* cited by examiner

MANAGING STORAGE DEVICE COMPUTE OPERATIONS

TECHNICAL FIELD

The present disclosure generally relates to managing storage device compute operations.

BACKGROUND

Often, storage systems are used to store and provide access to important data. Certain applications may require fast computation capabilities and various speed criteria. In some cases, various different applications may have different quality-of-service (QoS) requirements, and quite often, during peak loads, the storage devices that the applications rely upon may not be able to keep up with the latency requirements. For instance, the number of requests may exceed the capabilities of the storage devices, the high volume may cause the performance of the storage devices to slow down and/or experience failures or faults, etc.

As further context, peak compute loads can keep the underlying resources busy in a storage device. This can be especially true since the storage device generally has another primary load of storing and managing data in its storage medium (e.g., Flash). Generally, any computation latency in the storage device is a function of both compute resources and various states, such as the state of the firmware, garbage collection, memory, and storage-load. In other words, the storage load can limit the bandwidth/performance capability of the controller, the storage media, cache, etc. This can often introduce significant variance and randomness in compute results from storage devices compared to conventional controllers or hardware accelerators.

A storage device rendering a result late in time may sharply affect performance such that the storage device no longer meets its expected QoS specifications (e.g., as measured by parts per million). When the QoS of a storage device drops, delayed results, latency, etc. (e.g., due to the device choking), may result. A storage device rendering a compute result late in time could make the result useless, irrespective of the accuracy of the result. A client expecting the results may attempt to resort to other options after the delayed results, which may further cause client-side latency issues and churn.

A need exists for at least systems that are capable of mitigating the above-noted compute-related delays, latency, and/or other failures.

SUMMARY

Various aspects for managing storage device compute operations are described.

One general aspect includes a storage system that has a storage medium and a storage controller coupled to the storage medium. The storage controller is configured to: evaluate a processing capability; determine, based on the processing capability, only a portion of a compute operation is completable within a requested processing timeframe; determine an intermediate result; and provide the intermediate result. The storage controller may further be configured to process the portion of the compute operation within the requested processing timeframe, in which the intermediate result is determined based on the processed portion of the compute operation. The storage controller may further be configured to continue to process a remaining portion of the compute operation within a timeframe that is longer than the requested processing timeframe, determine a final processing result, and provide the final processing result.

Implementations may include one or more of the following features: that the compute operation is a multi-stage compute operation; a storage device includes the storage medium and the storage controller; that the storage device is coupled via a network to a client; that the client is a consumer computing device, a host system, or an embedded system; that the storage controller is further configured to receive a compute request from the client, wherein the compute request includes the requested processing timeframe; the client; that the client is the host system and is configured to tag the compute request with the requested processing timeframe; that the storage processor is further configured to monitor one or more operational parameters of the storage device and evaluate the processing capability of the storage device based on the one or more operational parameters; that the one or more operational parameters include a storage processing load, a processing unit load, a cache level, a hardware capability, a garbage collection load, a memory state, and/or a processing queue level; a client received the intermediate result; that the client is configured to unroll the compute operation based on the intermediate result; and that the storage controller is further configured to receive a wait request responsive to providing the intermediate result and pause a processing of a remaining portion of the compute operation until a subsequent request instruction that instructs the storage controller to continue processing the compute operation is received.

Another general aspect includes a computer-based method that includes evaluating a processing capability of a storage device; determining, based on the processing capability of the storage device, only a portion of a compute operation is completable within a requested processing timeframe; determining an intermediate result; and providing the intermediate result.

Implementations may include one or more of the following features: that the compute operation is a multi-stage compute operation comprised of a plurality of stages; that the intermediate result is an approximation of a final processing result or a partial result determined by processing some of the plurality of stages of the compute operation; processing the portion of the compute operation within the requested processing timeframe; that the intermediate result is determined based on the processed portion of the compute operation; continuing to process a remaining portion of the compute operation within a timeframe that is longer than the requested processing timeframe; determining a final processing result; and providing the final processing result; receiving a compute request from a client; that the compute request includes the requested processing timeframe; that the client is a consumer computing device, a host system, or an embedded system; monitoring one or more operational parameters of the storage device; and evaluating the processing capability of the storage device based on the one or more operational parameters; and that the one or more operational parameters include a storage processing load, a processing unit load, a cache level, a hardware capability, a garbage collection load, a memory state, and/or a processing queue level.

Still another general aspect includes a system that includes means for evaluating a processing capability of a storage device; means for determining, based on the processing capability of the storage device, only a portion of a compute operation is completable within a requested processing timeframe; means for determining an intermediate result; and means for providing the intermediate result.

The various embodiments improve the functionality of storage systems to overcome or at least reduce the issues in the storage networks and/or systems discussed above and, accordingly, are more reliable and/or efficient than other computing networks. That is, the various embodiments disclosed herein include hardware and/or software that advantageously improve processing and system flow, device QoS, saves client time, reduces failure or processing delays, and beneficially provides a storage or a compute service with higher QoS performance and reduced error PPM for various products. It should be understood that the technology provides numerous additional advantages and benefits, as discussed in further detail herein.

It should be understood that the language used in the present disclosure has been principally selected for readability and instructional purposes, and not to limit the scope of the subject matter disclosed herein.

DETAILED DESCRIPTION

The novel technology disclosed herein can advantageously optimize system flow. For example, the technology may include storage device capable of deducing a result for a compute operation within a timeframe that is too short for completing the entire compute operation. The timeframe in which the compute operation should be completed may be determined by a requestor of the compute operation. For example, a host system may send a compute request to an edge storage device and may tag the compute request with the timeframe in which the compute request should be completed.

In another example, an embedded system may include a control unit and storage device, such as a vehicle computer that performs onboard processing (e.g., autonomous or semi-autonomous driving functions, accident avoidance functions, etc.), and the control unit may be configured to send compute requests to the storage device for processing. The control unit may include the timeframe in the requests or the timeframe may be predetermined or hardcoded and retrievable from memory. Other variations are also possible and contemplated, such as where an operating system of a computing system sends compute request to storage device (s) of the computing system, in which case the operation system can include the desired timeframe for completing the compute task in the request.

The storage device that receives the compute request may process it and determine that the compute operation associated with the request may not be completable during the requested processing timeframe for various reasons, as discussed further herein, in which case the storage device may deduce a result for the compute request and provide it as an intermediate result to the requestor. The deduced intermediate result may be an approximation of an end result, a partial result generated from processing one or more stages of a multi-stage compute operation, or some other deduction that is usable by the requestor. The requestor may use the result to continue its own processing while awaiting the completed result, or may take other action, as discussed further elsewhere herein.

Figure 1:
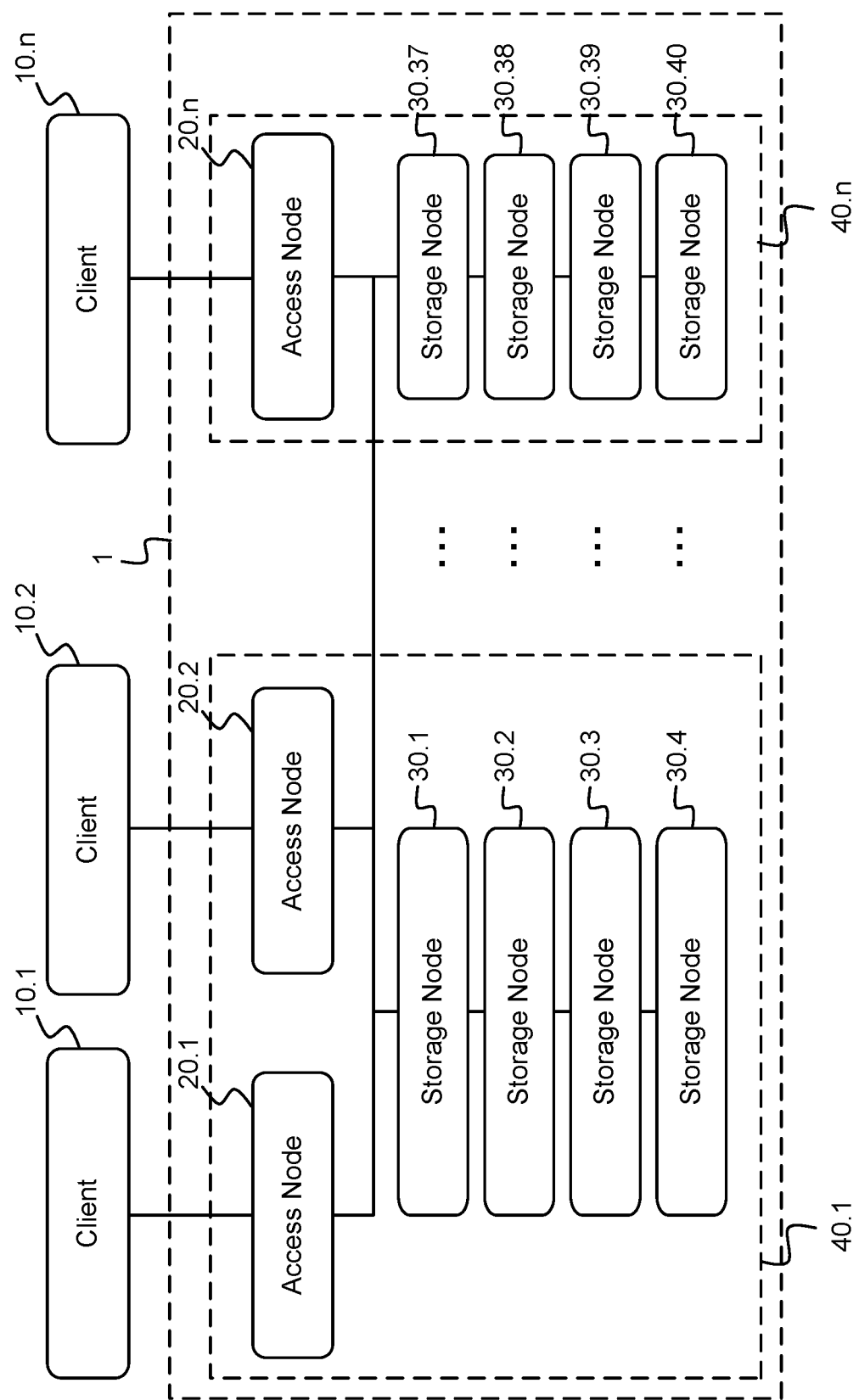
FIG. 1 schematically illustrates an example of a storage system.

FIG. 1 shows an embodiment of an example storage system 1. In some embodiments, the storage system 1 may be implemented as a distributed file, object, or other data storage system which is coupled to one or more clients 10.1-10.$n$ for accessing data through one or more controller or access nodes 20.1-10.$n$.

The storage system 1 may include a plurality of controller or access nodes 20 and a plurality of storage nodes 30 which may be coupled in a suitable way for transferring data, for example by means of any suitable data communication network, such as a local area network (LAN), a wide area network (WAN), an intranet, the Internet, a cell phone network, or any combination of communication networks. Access nodes 20, storage nodes 30, and the computing devices comprising clients 10 may connect to the data communication network using any suitable wireless, optical, etc., network connections or any suitable combination of such network connections.

The control node(s) 20 may comprise a host system (also referred to as a host layer) that provides access to the storage system 1 to clients 10. For example, the host system may expose application programming interface(s) (API(s)) or any other suitable request handling interfaces that the clients 10 may interact with the access data and/or perform computing functions. The storage node(s) 30 may each comprise or include one or more storage devices that store and provide access to data and/or perform various compute functions.

Clients 10 may run or interface with one or more applications that use data stored in the storage system 1. Such an application could, for example, be a dedicated software application running on a client computing device, such as a personal computer, a laptop, a mobile phone, or any other type of communication device that can interface directly with the storage system 1.

In further embodiments, the applications could, for example, comprise a suitable file system which enables a general-purpose software application to interface with the storage system 1, an API library for the storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

Although the embodiment of FIG. 1 shows only three access nodes 20 and forty storage nodes 30, the storage system 1 could comprise any other suitable number of interconnected access nodes 20 and storage nodes 30, such as but not limited to two, four, tens, hundreds, etc., or more access nodes 20 and two or more, tens, hundreds, etc., storage nodes 30.

These access nodes 20 and storage nodes 30 may be built as general-purpose computers or may be specially configured and/or physically adapted, such as configured for arrangement in large data centers (e.g., suitably configured to be arranged in modular racks 40.1-40.n comprising standard dimensions). Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces.

An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30.

In some embodiments, HTTP/REST protocols complying with the Amazon Simple Storage Service (S3) object storage service may enable data transfer through a REST application protocol interfaces (API), although other storage protocols are also contemplated, such as network file system (NFS) protocols, small computer system interface (SCSI) protocols, fiber channel (FC) protocols, non-volatile memory (NVM) protocols, etc.

In some embodiments, access nodes 20 may operate as a highly available cluster of controller nodes with one or more integrated and/or independent interface systems, and provide for example shared access to the storage nodes 30, metadata caching, protection of metadata, etc.

In some embodiments, clients 10, access nodes 20, and/or storage nodes 30 may be interconnected using one or more network fabric protocols and related physical and logical network interface. For example, storage nodes may include non-volatile memory express (NVMe) compliant storage devices, such as solid-state drives (SSD) connected via peripheral component interconnect express (PCIe) physical interfaces. Storage nodes 30 may include NVMe interface controllers or other suitable controllers to connect to a wider network infrastructure, such as a Fibre Channel or Ethernet network that supports NVMe traffic.

As shown in FIG. 1 several storage nodes 30 can be grouped together, for example because they are housed in a single rack 40. For example, storage nodes 30.1-30.4 and 30.37-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location. They are often geographically dispersed across different data centers, for example, rack 40.1 can be located at a data center in Europe and 40.n at a data center in the USA. In further embodiments, other variations may apply where storage node 30 groups may be virtual or comprised of storage nodes 30 that are disparately located.

Figure 2:
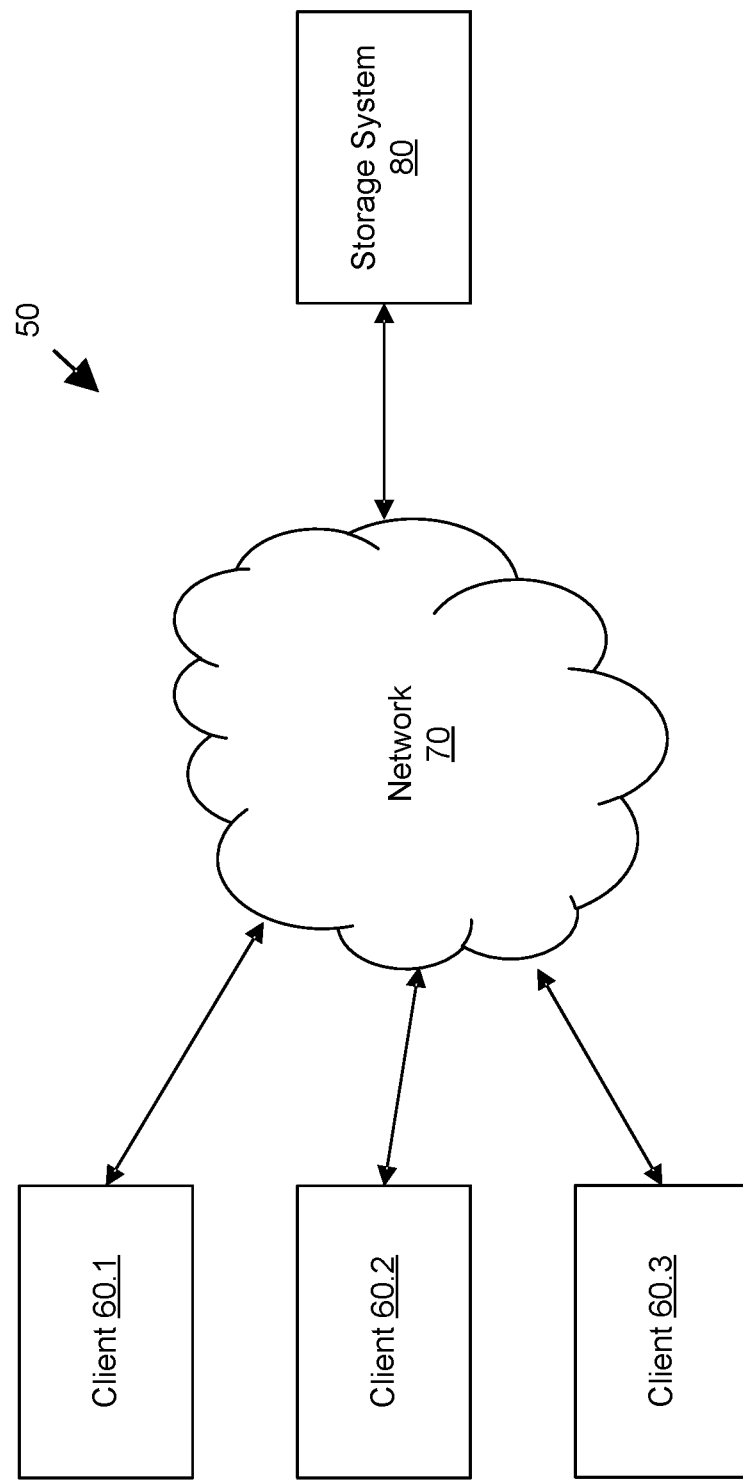
FIG. 2 schematically illustrates an example client architecture in which the storage system of FIG. 1 may operate.

FIG. 2 is a block diagram of an example storage network 50 using a client architecture. In some embodiments, storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, a hybrid thereof, a host system, an embedded system) capable of accessing storage system 80 or a storage device thereof utilizing network 70. Each client device 60, as part of its respective operation, may rely on sending input/output (I/O) requests to the storage system 80 to write data, read data, and/or modify data. Specifically, each client device 60 can transmit I/O requests to read, write, store, communicate, propagate, and/or transport instructions, data, computer programs, software, code, routines, etc., to the storage system 80.

Client device(s) 60 and storage system 80 may comprise at least a portion of a client-server model. In general, the storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as storage system 1 in FIG. 1. In some embodiments, a storage system 80 may be a local storage system that is coupled directly to a client 60 via a wired connection or a local network connection (a consumer's Wi-Fi™ network). Other variations are also applicable.

Figure 3:
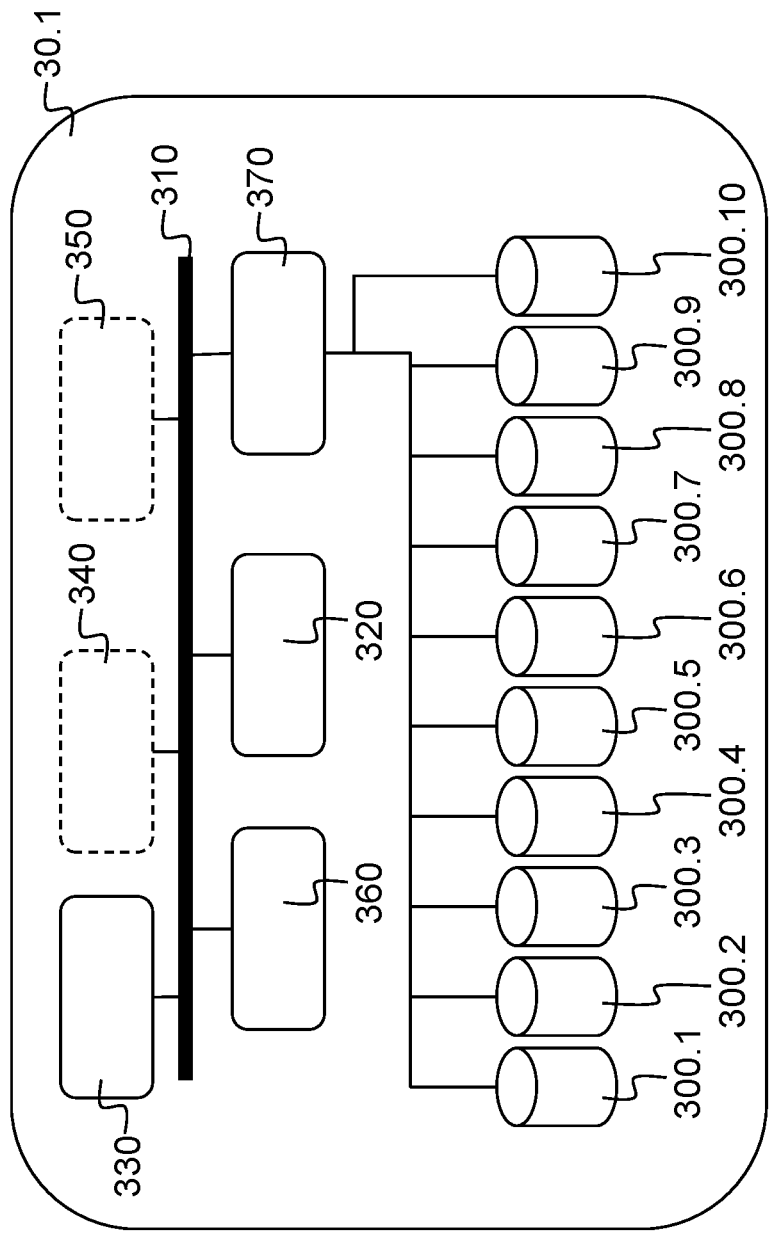
FIG. 3 schematically illustrates an example of a storage node of the storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of suitable processor or microprocessor that interprets and executes instructions. Local memory 330 may include random-access memory (RAM) or another type of dynamic storage device that stores information and instructions for execution by processor 320 and/or a read-only memory (ROM) or another type of static storage device that stores static information and instructions for use by processor 320. Input unit 340 may include one or more suitable mechanisms that permit an operator to input information to the storage node 30.1, such as a keyboard, a mouse, a pen, voice recognition and/or biometric mechanisms, etc. Output unit 350 may include one or more suitable mechanisms that output information to the operator, such as a display, a printer, a speaker, etc. Communication interface 360 may include any transceiver-like mechanism that enables storage node 30.1 to communicate with other devices and/or systems, for example, mechanisms for communicating with other storage nodes 30 or access nodes 20, such as, for example, gigabit (Gb) Ethernet interfaces.

Storage element interface 370 may comprise a storage interface, for example, a SATA interface, SCSI, a PCIe/NVMe interface, or another suitable interface, for connecting bus 310 to one or more storage elements 300, such as one or more local storage drives, for example, multi-terabyte (TB) SATA disk drives, or multi-terabyte (e.g., 2 TB) NVMe SSDs, or another suitable storage drive, and control the reading and writing of data to/from these storage elements 300. In one exemplary embodiment, as shown in FIG. 3, such a storage node 30.1 could comprise ten 6 TB SATA disk drives as storage elements 300.1-300.10 and in this way storage node 30.1 would provide a storage capacity of 60 TB to the storage system 1.

According to the exemplary embodiment of FIG. 1, and in the event that storage nodes 30.2-30.40 are identical to storage node 30.1 and each comprises a storage capacity of 60 TB, the storage system 1 would then have a total storage capacity of 2400 TB. Similarly, storage node 30.1 could comprise ten 2 TB SSDs as storage elements 300.1-300.10 and provide 20 TB to the storage system 1, resulting in a total storage capacity of 800 TB. Any suitable storage capacity is applicable. For instance, in some configurations, the storage system 1 may include a mix of storage nodes with different configurations, such as SSDs, HDDs, other storage device types, etc., of varying capacities.

As is clear from FIGS. 1 and 3, the storage system 1 may comprise a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the storage system. Each of the storage nodes 30 may comprise a share of these storage elements 300.

As shown in FIG. 3, storage node 30.1 comprises ten storage elements 300.1-300.10. Other storage nodes 30 could comprise a similar amount of storage elements 300 or may have different amounts, depending on the configuration. Storage node 30.2 could, for example, comprise six storage elements 300.11-300.16, and storage node 30.3 could, for example, comprise four storage elements 300.17-300.20.

The storage elements 300 or a portion thereof may be redundant and operate independently of one another. For instance, if one particular storage element 300 fails its function it could conveniently be taken on by another storage element 300 in the storage system 1.

Figure 4:
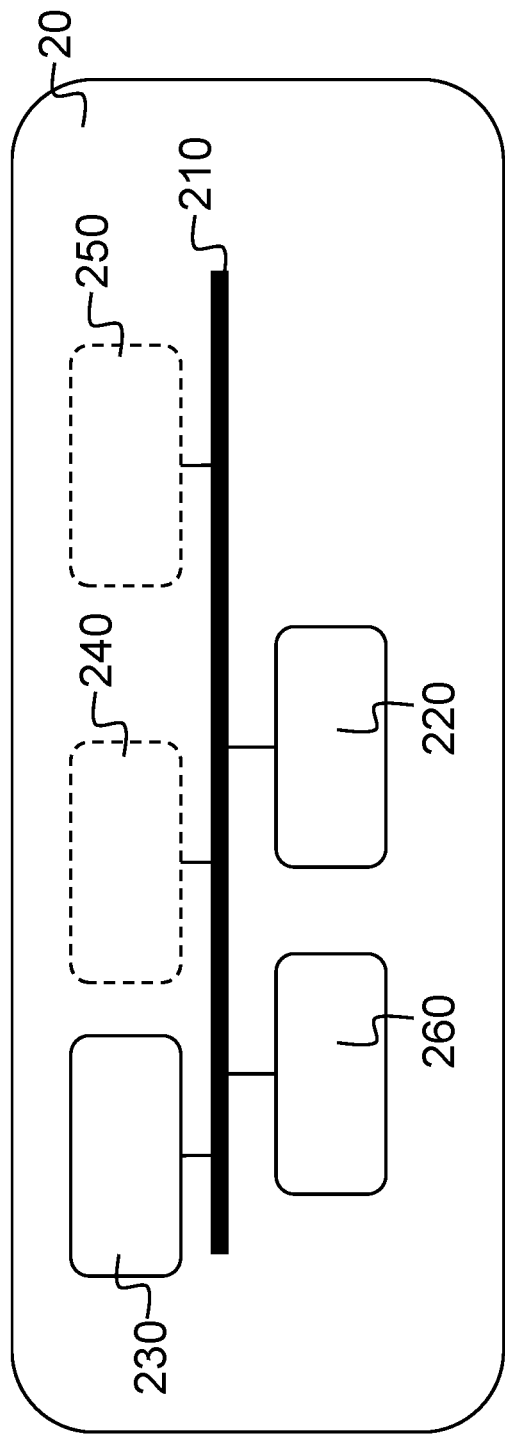
FIG. 4 schematically illustrates an example of a controller node or access node of the storage system of FIG. 1.

FIG. 4 shows a schematic representation of an embodiment of the controller or access node 20. Access node 20 may include storage controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of suitable processor or microprocessor that interprets and executes instructions. Local memory 230 may include a random access memory (RAM) or another type of dynamic storage device that stores information and instructions for execution by processor 220 and/or a read-only memory (ROM) or another type of static storage device that stores static information and instructions for use by processor 320 and/or any suitable storage elements such as a hard disk or a solid-state storage element. An optional input unit 240 may include one or more suitable mechanisms that permit an operator to input information to the access node 20 such as a keyboard, a mouse, a pen, voice recognition and/or biometric mechanisms, etc. Optional output unit 250 may include one or more suitable mechanisms that output information to the operator, such as a display, a printer, a speaker, etc. Communication interface 260 may include any transceiver-like mechanism that enables access node 20 to communicate with other devices and/or systems, for example, mechanisms for communicating with other storage nodes 30 or access nodes 20 such as, for example, Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
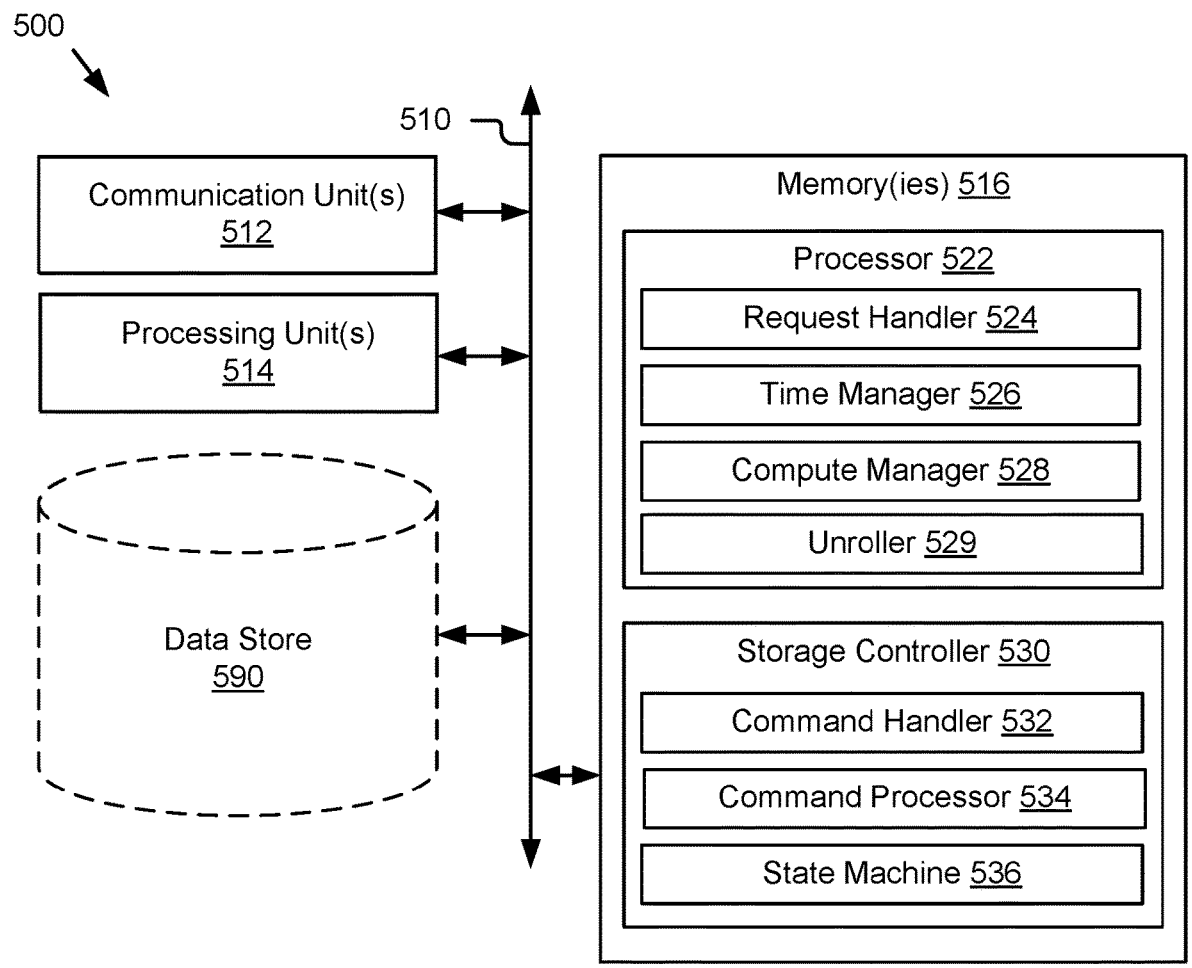
FIG. 5 schematically illustrates an example processing system.

FIG. 5 illustrates a block diagram of an example processing system 500 that may embody various different components of a storage system, such as a host system or storage device. In some embodiments, the processing system 500 may incorporate elements and configurations similar to those shown in FIGS. 1-4 and/or 6. For example, the processing system 500 may embody a host system, one or more storage devices, one or more clients 10, one or more access nodes 20, and/or one or more storage nodes 30, and may be configured with one or more of the components shown.

In some embodiments, some components shown may be included in a host system and some components may be included in one or more storage devices. In further embodiments, the components may be consolidated in on one or more storage devices such as within a storage node 30 or a stand-alone storage device. In further embodiments, a client may be coupled to storage device(s) without an intervening host system or access/controller nodes and may include a processor 522. In further embodiments, a host system may act as a client and may be referred to herein as a client and may be coupled to one or more storage devices and interact with them as discussed herein. Other variations are also possible.

As shown, the processing system 500 may include a bus 510 interconnecting communication unit(s) 512, processing unit(s) 514, and memory(ies) 516. The bus 510 may include one or more wired or wireless couplings (e.g., conductors) that permit communication among the components of access system 500. The communication unit(s) 512 may include any transceiver-like mechanism that enables access system 500 to communicate with other devices and/or systems. For example, the communication unit(s) 512 may include wired or wireless mechanisms for communicating with file system clients, other access systems, and/or one or more data storage systems or components. In some embodiments, the communication unit(s) 512 may enable communication among fabric nodes in a storage network fabric and host systems, access nodes, storage nodes, and/or subcomponents thereof, such as storage devices, may be configured as fabric nodes.

The processing unit(s) 514 may include any type of processor or microprocessor that interprets and executes instructions. Memory(ies) 516 may include a random access memory (RAM) or another type of dynamic storage device that stores information and instructions for execution by processing unit(s) 514 and/or a read-only memory (ROM) or another type of static storage device that stores static information and instructions for use by processing unit(s) 514 and/or any suitable storage elements such as a hard disk or a solid-state storage element.

Depending on the configuration, the processing system 500 may include or have access to one or more databases and/or specialized data stores, such a metadata store. The databases may include one or more data structures for storing, retrieving, indexing, searching, filtering, etc. of structured and/or unstructured data elements. The databases, metadata store, etc., and/or other databases or data structures may be maintained and managed in the processing system 500 or separate computing systems, such as storage nodes, controller nodes, or access nodes, with separate communication, processor, memory, and other computing resources and accessed by the processing system 500 through data access protocols.

The processing system 500 may include a data store 590 comprised of one or more storage media, such as the non-transitory storage media discussed herein (e.g., 644, those discussed with reference to the storage nodes 30, etc.). In an embodiment where the processing system 500 represents a storage device, such as an SSD, the data store 590 may be comprised of a plurality of non-volatile memory units (e.g., flash memory cells, dies, etc.) configured to store, provided access to, and delete data, although any other suitable storage media are also contemplated and applicable.

The processing system 500 may include a plurality of executable components or subsystems that are stored and/or instantiated in one or more memory(ies) 516 for execution by processing unit(s) 514. For example, the memory(ies) may include a processor 522 having a request handler 524, a time manager 526, a compute manager 528, and an unroller 529, and may include a storage controller 530 having a command handler 532, a command processor 534, and a state machine 536. These components may comprise computer logic executable to perform the acts and functionality described herein. While the processor and storage controller 530 are described as two separate components with specific sub-components, it should be understood that their structure, acts, and/or functionality, and/or the structure, acts, and/or functionality of one or more of their sub-components may be combined into the same component or separated into additional components without departing from the scope of this disclosure.

Some or all of the components 522, 524, 526, 528, 529, 530, 532, 534, and/or 536 may be implemented using software executable by one or more processing units 514, using hardware, such as but not limited to a field-programmable gate array (FPGA), an application-specific integrated circuit (ASIC), etc., and/or a combination of hardware and software, etc. The structure, acts, and or functionality of the processor 522, request handler 524, time manager 526, compute manager 528, unroller 529, storage controller 530, command handler 532, command processor 534, and state machine 536 are discussed in further detail elsewhere herein, such as with reference to FIGS. 6-9B.

In some embodiments, a storage device may include the storage controller 530 and one or more storage media, and may be configured to perform both compute operations and storage-related functions, such as reading, writing, deleting, garbage collecting, or otherwise managing data in the one or more storage media. The command handler 532, and more broadly the storage device, may be responsible for handling the both the storage and compute operations, and because the storage device's resources, such as flash channels, caches, and dies, are being utilized for both the modes, the storage device, and the command handler 532 in particular as discussed below, may need to determine how to handle new requests and the tasks in queue during various periods, such as peak processing periods or portions thereof.

As such, the ability of the storage device to carry out a compute operation, particularly within a prescribed timeframe, can vary depending on the other tasks that the storage device may be simultaneously carrying out. On the other hand, it can be beneficial to utilize the processing resources of a storage device, particularly during low-utilization periods (e.g., where the number of other tasks, such as storage-related tasks are low and processing bandwidth is available).

Figure 6:
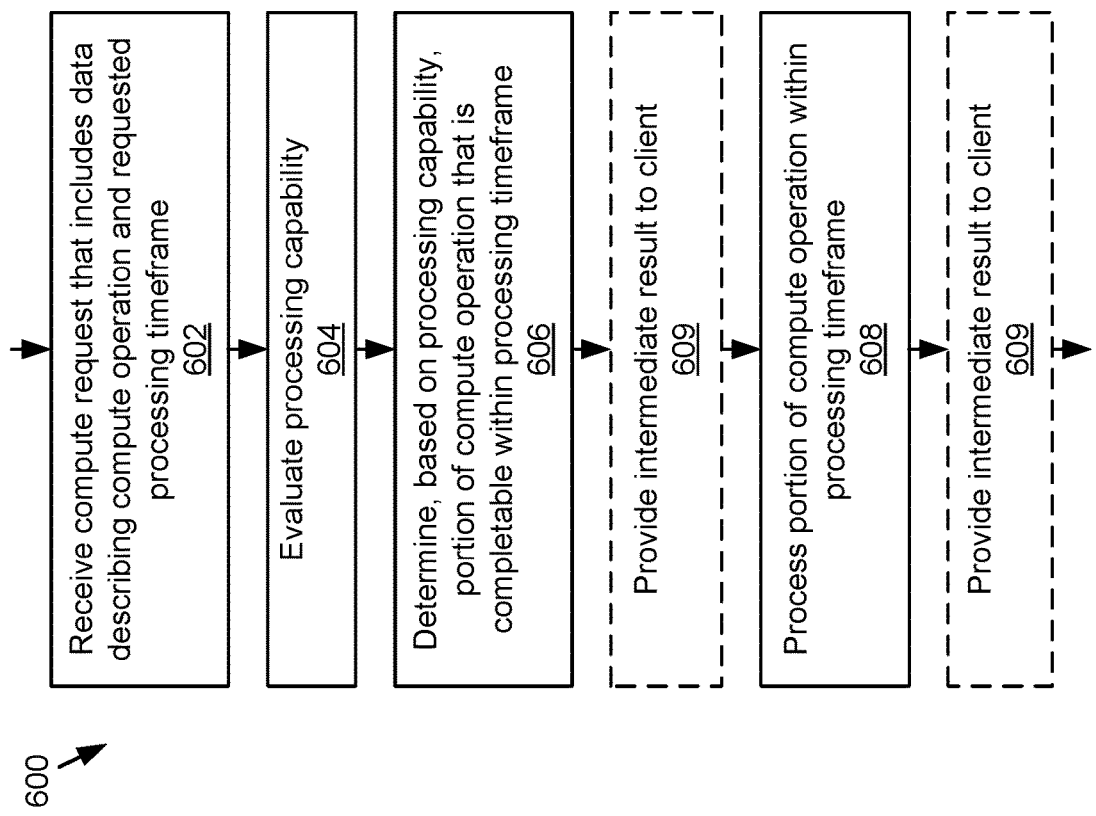
FIG. 6 is a flowchart of an example method for deducing an intermediate result for a compute operation.
Figure 8:
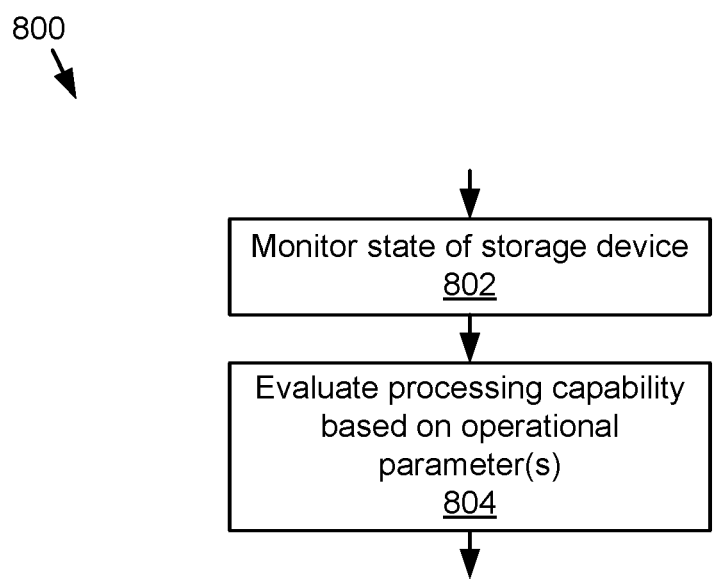
FIG. 8 is a flowchart of an example method for evaluating processing capability based on operational parameters.

FIG. 6 is a flowchart of an example method 600 for deducing an intermediate result for a compute operation. In block 602, the command handler 532 of the storage controller 530 may receive a compute request requesting execution of a compute operation by a storage device that the storage controller 530 is associated with.

For instance, the command handler 532 of a storage device may receive the compute request from a client, such as a consumer computing device (e.g., laptop, desktop, mobile device, etc.), a host system, or an embedded system. The storage device may be directly coupled (wirelessly or wiredly) to the client, or may be is coupled via a network to a client, and may receive requests and send responses via that connection.

The command handler 532, once receiving the compute request, may interpret it. The compute request includes data describing the compute operation to be performed and the parameter(s) for performing it, such as a requested processing timeframe. For instance, a client that sent the compute request may tag the compute request with the requested processing timeframe. The processing timeframe may define a time by which the compute request should be satisfied, a duration for performing the services, or another similar time condition. The command handler 532 may process the parameters from the compute request for use by the command processor 534.

A compute operation may include any method, function, or other processing task, such as converting a file from one format to another, transforming or filtering an image, processing an object using machine learning logic, processing input data using an algorithm, etc. In some cases, the compute operation is a multi-stage compute operation that is comprised of a plurality of stages. For instance, many compute operations, such as image processing, machine learning, file conversion, encoding and decoding, operations, are resource intensive multi-stage operations comprised of multiple sequential and/or parallel tasks that may require significant amounts of processing time and memory to carry out.

The command handler 532 may maintain a process queue and add, sideline, or remove storage and compute operations as they are received, rejected, stopped, idled/paused, or processed, etc. In some cases, the command handler 532 may prioritize various operations over others based on their importance or criticality. For instance, but not limitation, operations with dependencies may be prioritized over compute operations in some cases because a client, such as a host system, may churn until those operations are completed. In another example, a crucial compute operation may be prioritized above other storage or compute operations because it is a critical system operation or other important operation.

In block 604, the command handler 532 of the storage controller 530 may evaluate a processing capability. As further shown in FIG. 8, which is a flowchart of an example method 800 for evaluating processing capability based on operational parameters, the state machine 536 in block 802 may monitor operational parameter(s) of the storage device and determine the operational state of the storage device, such as the state of internal resources, load, cache, hardware accelerators, garbage collection, memory units, the depth of a task queue (comprising other compute operations for other clients, storage operations, etc.), etc.

In some embodiments, a requesting program or application may specify the timeframe, or the time manager 526 may determine it. For instance, a stakeholder of an application may set predefined time constraints for various compute operations (e.g., such as operations called from specific programs, methods, modules, or applications, etc.), various operation types, the time of day, day of year, and/or other parameters, and the time manager 526 may select the appropriate time constraint based on the request, such as the nature of the compute operation, the sender of the compute operation, a date and/or time the request was sent and/or the compute operation is to be executed, etc. Other variations are also possible and contemplated.

The operational state of the storage device may be used to determine the present health and/or processing efficiency or capability of the storage device. The state machine 536 may dynamically determine the state responsive to receiving a request from another component, such as the command handler 532, and/or may iteratively determine the state and store data (independently or responsive to receiving a signal from the command handler 532 or another component) reflecting the state in storage, such as a memory 516, for retrieval by other components, such as the command handler 532. Other variations are also possible and contemplated.

The command handler 532 in block 804 may evaluate the processing capability of the storage device based on the output of the monitoring in block 802 and the requested processing timeframe. For instance, the command handler 532 can determine if the tagged wait period is consistent with the storage device's data processing ability. As a further example, the output may quantify one or more operational parameters that the command handler 532 may consider to determine if the compute operation can be completed by the requested processing timeframe. In some cases, the mix of operating parameters that are evaluated may be different based on which compute operation is being requested. For instance, some compute operations require more memory, while some other compute requirements require hardware acceleration, brute processing power, or other resources, etc. The command handler 532 may use reference data stored in the memory(ies) 516 to determine what operational parameters are relevant and should be evaluated. Further example operational parameters that may be evaluated include a storage processing load, a processing unit load, a cache level, a hardware capability or availability, a garbage collection load, a memory state, and/or a processing queue level.

Referring again to FIG. 6, in block 606, the command handler 532 may determine, based on the processing capability, that only a portion of the compute operation is completable within a requested processing timeframe. In some embodiments, the command handler 532 may use predetermined threshold(s), threshold(s) based on prior durations required to complete the same or similar compute operations, machine learned probabilities, or other suitable triggers or measures to determine if the processing capability is sufficient to complete processing of the compute operation within the requested timeframe.

In block 608, the command handler 532 may determine and provide an intermediate result. The intermediate result may be a deduction of a final result of the compute operation and may reflect estimated or partial results. For instance, the estimated result may be an approximation of a final processing result that would be expected if the compute operation were fully processed, or a partial result determined by processing some of the plurality of stages of the multi-stage compute operation.

By way of further example, responsive to the storage controller 530 determining that the requested compute operation could potentially time out due to other operations being processed, the storage controller 530 may compute an approximation (e.g., a percentage, an estimated detection, etc.) of the compute operation or executes a portion of the compute operation, which may reach an intermediate point based on the admissible wait time and produce a partial result of the complete result once/if processed.

In the case of an approximation, a portion of the compute operation may or may not be processed, depending on the nature of the approximation, as reflected by the hash-lined block 609 shown in FIG. 6. On the other hand, if the intermediate result reflects a portion of the processing of the compute operation, then the intermediate result may be provided after the portion has been processed. More particularly, in block 608, the command processor 534 may process the portion of the compute operation within the requested processing timeframe and may determine the intermediate result based on the processed portion of the compute operation.

Figure 7:
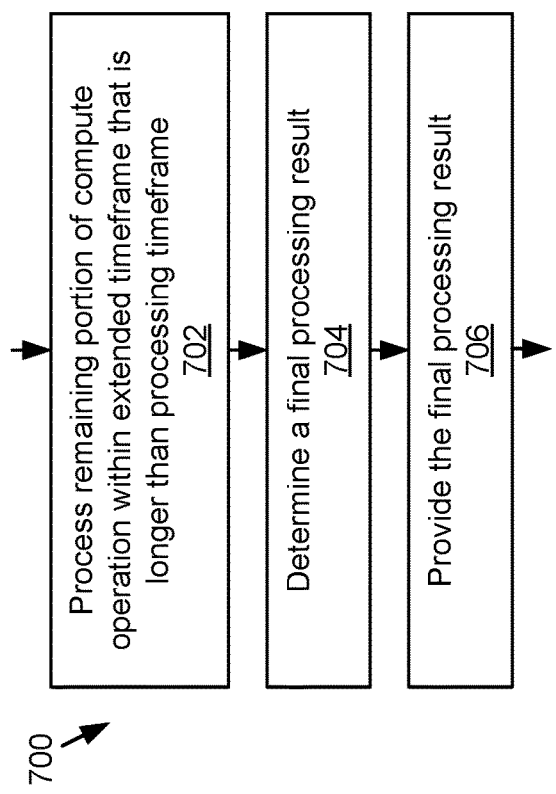
FIG. 7 is a flowchart of an example method for completing processing of a compute operation.

In some cases, upon processing 608, the method 600 may proceed to method 700 as shown in FIG. 7 and proceed automatically with processing the remaining portion of the compute operation (in some cases based on a parameter included in the compute request instructing that the compute be handled in this way), in which case blocks 608 and 702 may be continuous, although other variations are possible, such as those that wait for a subsequent response to the intermediate result, as discussed further elsewhere herein.

The intermediate result may be provided to the requestor that requested execution of the compute operation, such as a host system, an operating system, an embedded system controller, a remote client that sent the request via a host system that is coupled to the storage device, or any other suitable control or processing system. For instance, in a host system embodiment, the host system may be coupled via a network fabric to the storage device and the storage device may send the intermediate result in a response to the host system. The request handler 524 of the requestor, which may have sent the compute request, may, upon receiving the response, process the response to interpret the intermediate result, and the compute manager 528 may determine how to respond to it, as discussed further elsewhere herein.

Figure 9A:
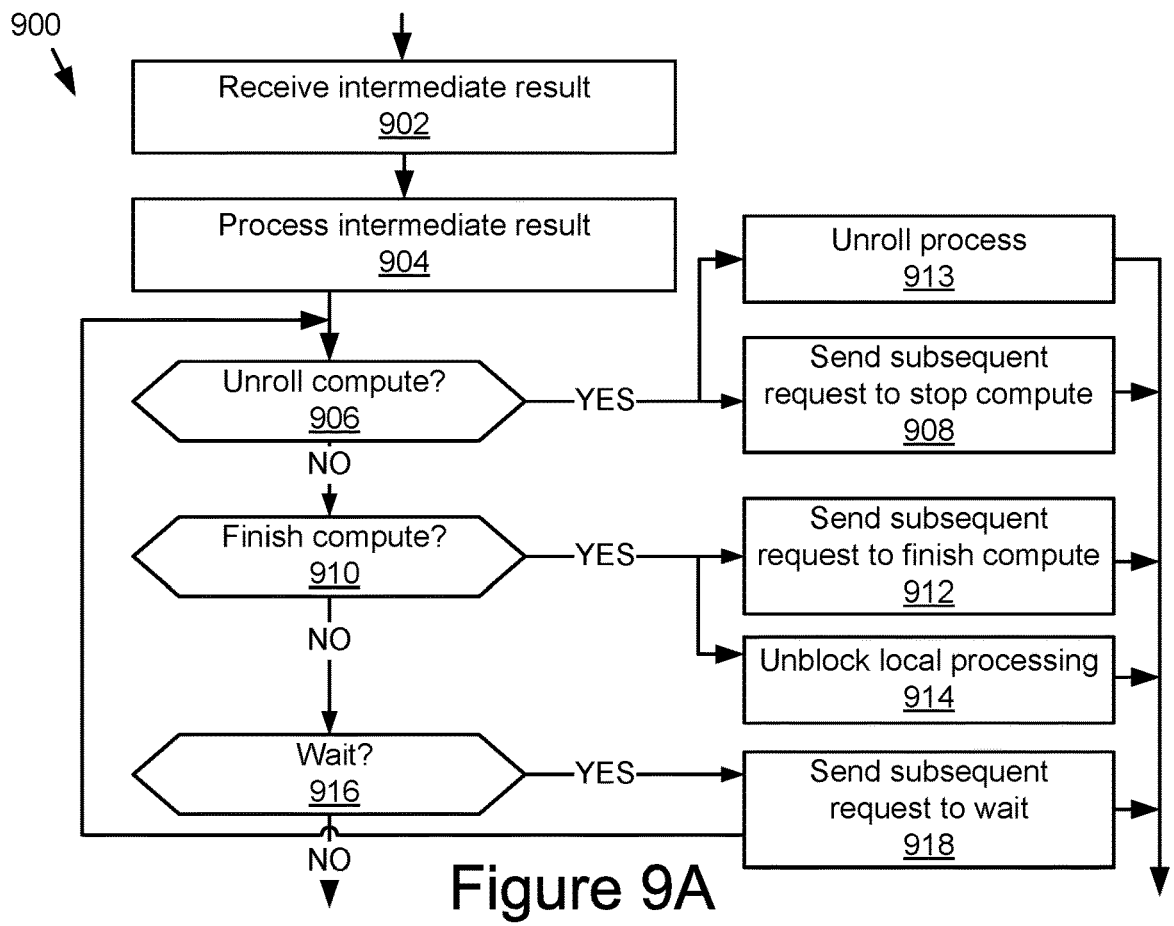
FIG. 9A is a flowchart of an example method for processing and acting on an intermediate result.

Upon receiving the intermediate result, the requestor may determine how to proceed with the remainder of the processing of compute result based on the intermediate result. For example, as shown in FIG. 9A, which is a flowchart of an example method 900 for processing and acting on an intermediate result, the request handler 524 of the processor 522, which the processing system 500 that embodies the requestor may include, may receive the intermediate result in block 902 and the compute manager 528 may interpret the intermediate result in block 904. In particular, in block 904, the compute manager 528 may evaluate an outcome described by the intermediate result and determine based on the outcome, whether to continue with processing the compute operation, stop the compute operation, pause the processing, or take other action, such as prompt for user input responsive to sending a notification to a user device, presenting the notification, receiving input, and determining based on the input whether additional processing is needed or whether the compute operation can be canceled.

More specifically, in block 906, the compute manager 528 determines whether to unroll the compute operation based on the processing in block 904. For instance, if the intermediate result is not sufficient or indicative that the final result would also be inadequate (e.g., fail, not satisfy a threshold, etc.), the compute manager 528 could determine to unroll the processing that the client had performed so far and was deciding whether to continue with based on the result of the compute operation.

If the determination in block 906 is affirmative, the request handler 524 may, in block 908, send a subsequent request to the storage device requesting to stop or cancel the compute request. Also, the compute manager 528 may also unroll any tentative or implemented changes, delete data produced by that process so far, termination the process, and so forth, as shown in block 913. In some cases, the act in block 908 may be unnecessary as the storage controller 530 may just cancel any compute operations that were awaiting further input from the request after a predetermined amount of time had passed, depending on the configuration.

If the determination in block 906 is negative, the compute manager 528 proceeds to block 910 and determines whether to have the storage device finish processing the compute operation. If the determination in block 910 is affirmative, the request handler 524 may, in block 912, send a subsequent request to the storage device requesting to complete processing of the compute request. In some cases, the act in block 912 may be unnecessary as the storage controller 530 may continue to process the compute operation while or after sending the intermediate result. Whether to continue with the compute operation or wait for further instruction from the requestor may be a further parameter provided with the compute request in block 602 of method 600, and the command processor 534 may control processing of the compute operation accordingly (e.g., wait for a subsequent request or continue processing automatically).

Advantageously, in response to an affirmative determination in block 910, the compute manager 528 may, in block 914, also proceed to unblock local processing of operations that were dependent on and waiting for completion of the compute request. This beneficially prevents the application from having to wait or churn while awaiting the full compute result.

By way of example, the requestor that sent the compute request could execute logic that can use or proceed with either an intermediate result or a final processing result. In other words, regardless of whether the result is premature, it can either proceed or attempt to proceed with the next steps of the function or method that it is running was waiting for the result of the compute operation.

These deduced results (e.g., approximations) can advantageously keep the requestor's processing flow running, and on determining from the final results that the approximation is not in sync, the requestor could roll back some of the activities. In other scenarios, the deduced (intermediate) result is sufficient and can unblock the requestor's initial logic and a follow-on precise computation can later strengthen it.

As a further example, the compute operation may be an analytics function that processes a set of stored logical data (which may be retrieved from a remote or local repository (e.g., the data store 590), depending on the configuration). By processing some of the stages of the compute operation, an intermediate detection may be completed within the prescribed timeframe. For instance, the intermediate detection could be an object comprising a four-wheeled vehicle. While, with more time, the object could be established as a van, providing the intermediate result could be sufficient for the program running on the client to continue its own processing and the requestor could send a subsequent request to the storage device to discontinue with the compute result (since the intermediate result was good enough in that case).

In another example, the compute operation may recognize text from an image, such as the license plate number of a vehicle. The partial processing may only determine the license plate number with 80% accuracy. The intermediate result provided to the requestor may include the 80% accurate result, and the requestor can further process the result itself and determine that the intermediate result is sufficient (in this and other cases, a 70-80% accurate result is often sufficient enough to converge to a usable result, although other ranges and percentages could apply). As a result, the requestor could advantageously unblock the client software module that it is running and save time, as opposed to having to wait for further results. In other cases, the requestor may determine that the result is not sufficient and may either send a subsequent request to the storage device to continue processing the compute operation or wait for those further results to arrive (in a configuration where they are automatically provided).

If the determination in block 910 is negative, the computer manager 528 proceeds to block 910 and determines whether to have the storage device pause processing/wait in block 916. If the determination in block 916 is affirmative, the computer manager 528 may, in block 918, send a subsequent request to the storage device to pause processing. If the determination in block 916 is negative, the method 900 may end, repeat, or proceed to other operations.

Figure 9B:
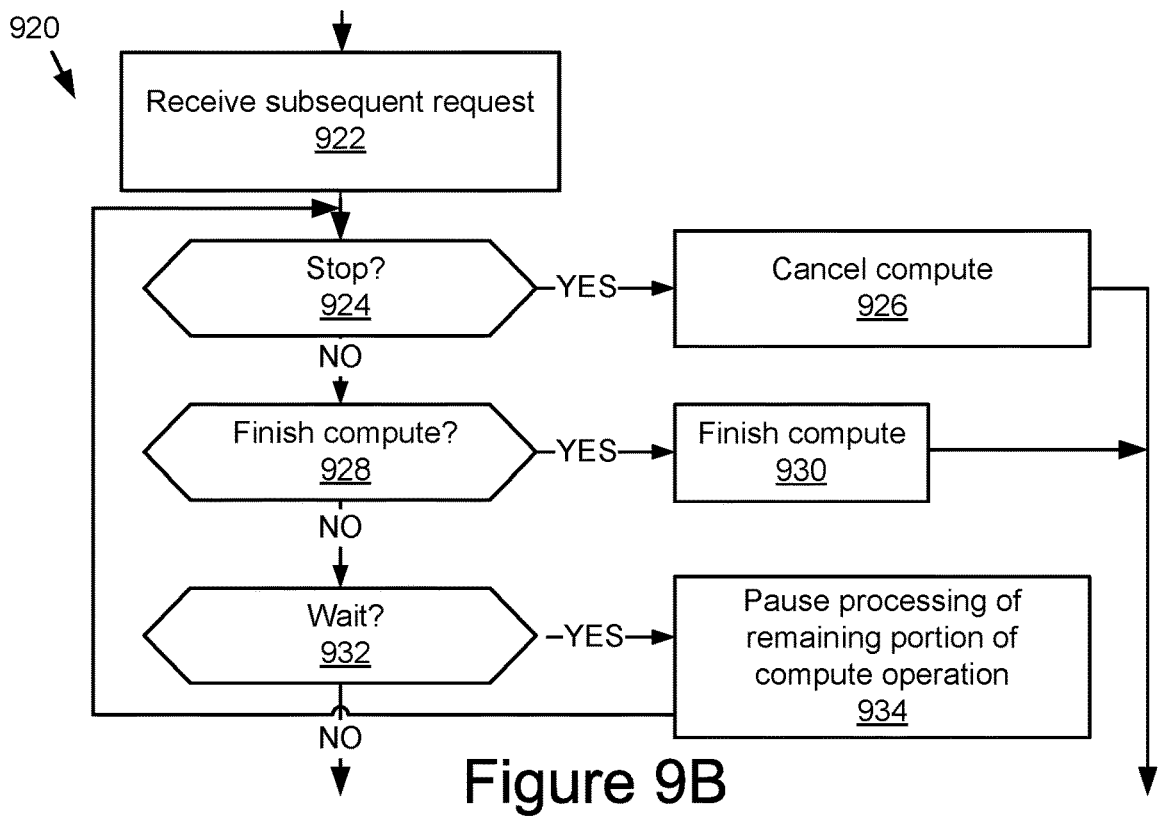
FIG. 9B is a flowchart of an example method for processing subsequent requests.

FIG. 9B is a flowchart of an example method 920 for processing subsequent requests. In block 922, the command handler 532 may receive a subsequent request responsive to providing the intermediate result. Using the request, the command handler 532 may determine how to proceed with the compute request based on the parameters included in the subsequent request.

In some cases, the parameters may indicate to cancel the compute request, finish the compute operation based on any timeline, only finish the request if the rest of the compute operation if it can be completed based on revised timeframe, pause processing until a further request is received and/or automatically cancel the request if a subsequent request is not received with a specified timeframe, etc. As with all requests discussed herein, the subsequent request may include a unique identifier for the compute request, which it may use to identify the appropriate compute request and manage it appropriately.

More particularly, in block 924, the command handler 532 may determine whether to stop the compute operation. If the determination in block 924 is affirmative, the command handler 532 may proceed to block 926 and cancel the compute operation and may clean up any artifacts or byproducts (e.g., data, stored variables, etc.) produced by any partial processing. If the determination in block 924 is negative, the command handler 532 may proceed to block 928.

In block 928, the command handler 532 may determine whether to finish the compute operation. If the determination in block 928 is affirmative, the command processor 534 may proceed to block 930 and finish the compute operation.

For example, referring to FIG. 7, which is a flowchart of an example method 700 for completing processing of a compute operation, the command processor 534 in block 702 may continue to process a remaining portion of the compute operation (e.g., the remaining stages, etc.) within a timeframe that is longer than the requested processing timeframe. In block 704, the command processor 534 may determine a final processing result. The final processing result may reflect a complete processing of the compute operation and include corresponding output, data, etc. In block 706, the command handler 532 may provide the final processing result. For instance, the final processing result may be provided to the requestor, such as a client (e.g., the host system, embedded system, etc.), which may, for example, process it to confirm, enhance, override, etc., the intermediate result or be used in later phases of the program that the client is executing, as discussed in further detail elsewhere herein. In some cases, the method 700 may be executed and continue without restrictions (without having to wait for a response to the intermediate result), and resend the full and final result, irrespective of the initially requested processing timeframe/permissible wait period.

Returning to FIG. 9B, if the determination in block 928 is negative, the command handler 532 may proceed to block 932 and determine whether to wait for another subsequent request. If the determine in block 932 is affirmative, the command handler 532 may proceed to block 934 and pause the processing of a remaining portion of the compute operation until a subsequent request that instructs the storage controller to continue processing or cancel processing the compute operation is received. Block 934 may return and wait for subsequent requests or time out after a predefined period.

Processing after blocks 908, 912, 914, 916, 918, 926, 930, 932, or 934 may continue to other operations, return to other blocks, wait, end, or continue to other functions or functionality, as necessary.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

Various aspects of the present technology may be embodied as a system, method, apparatus, computer program product or another aspect. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer-readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).f Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
    a storage medium; and
    a storage controller coupled to the storage medium and configured to:
        execute a state machine to monitor one or more operational parameters of a storage device;
        evaluate, based on the one or more operational parameters from the state machine, a processing capability of the storage device;
        determine, based on the processing capability and compute requirements of a compute operation, that only a portion of the compute operation is completable by the storage device within a requested processing timeframe;
        execute, by the storage device, the portion of the compute operations;
        determine, based on the executed portion of the compute operation within the requested processing timeframe, an intermediate result, wherein:
            the compute operation is a multi-stage compute operation comprised of a plurality of stages; and
            the executed portion of the multi-stage compute operation includes at least one stage of the plurality of stages of the multi-stage compute operation;
        provide the intermediate result;
        continue to process a remaining portion of the multi-stage compute operation within a timeframe that is longer than the requested processing timeframe;
        determine a final processing result; and
        provide the final processing result.

2. The system of claim 1, wherein the intermediate result is an approximation of a final processing result.

3. The system of claim 1, wherein the intermediate result is a partial result determined by processing some of the plurality of stages of the multi-stage compute operation.

4. The system of claim 1, wherein:
    the storage controller is further configured to receive, responsive to the intermediate result, a finish compute request; and
    continuing to process the remaining portion of the multi-stage compute operation is responsive to receiving the finish compute request.

5. The system of claim 1, further comprising the storage device including the storage medium and the storage controller, wherein:
    the storage device is configured to couple via a network to a client; and
    the client is a consumer computing device, a host system, or an embedded system.

6. The system of claim 5, wherein the storage controller is further configured to:
    receive a compute request from the client, wherein the compute request includes the requested processing timeframe.

7. The system of claim 6, further comprising:
    the client, wherein the client is the host system and is configured to tag the compute request with the requested processing timeframe.

8. The system of claim 1, wherein determining that only a portion of the compute operation is completable within the requested processing timeframe uses at least one predetermined threshold to evaluate the one or more operational parameters.

9. The system of claim 1, wherein the one or more operational parameters include:
    a storage processing load;
    a processing unit load;
    a cache level;
    a hardware capability;
    a garbage collection load;
    a memory state; and/or
    a processing queue level.

10. The system of claim 1, further comprising:
    a compute manager in communication with the storage controller configured to:
        determine, based on the intermediate result, to unroll the compute operation;
        cancel the compute operation; and
        unroll changes from executing the portion of the compute operation.

11. The system of claim 1, wherein the storage controller is further configured to:
    receive a wait request responsive to providing the intermediate result; and
    pause the processing of the remaining portion of the compute operation until a subsequent request that instructs the storage controller to continue processing the compute operation is received.

12. A computer-implemented method, comprising:
    executing a state machine to monitor one or more operational parameters of a storage device;
    evaluating, based on the one or more operational parameters from the state machine, a processing capability of the storage device;

determining, based on the processing capability of the storage device and compute requirements of a compute operation, only a portion of the compute operation is completable by the storage device within a requested processing timeframe;

executing, by the storage device, the portion of the compute operations;

determining, based on the executed portion of the compute operation within the requested processing timeframe, an intermediate result;

providing the intermediate result;

receiving a wait request responsive to providing the intermediate result; and pausing a processing of a remaining portion of the compute operation until a subsequent request that instructs to continue processing the compute operation is received.

13. The computer-implemented method of claim 12, wherein:

the compute operation is a multi-stage compute operation comprised of a plurality of stages; and the intermediate result is:

an approximation of a final processing result; or a partial result determined by processing some of the plurality of stages of the multi-stage compute operation.

14. The computer-implemented method of claim 13, further comprising:

processing at least one stage of the plurality of stages of the multi-stage compute operation within the requested processing timeframe, wherein the intermediate result is the partial result determined based on the executed portion of the multi-stage compute operation.

15. The computer-implemented method of claim 14, further comprising:

continuing to process a remaining portion of the multi-stage compute operation within a timeframe that is longer than the requested processing timeframe;

determining a final processing result; and providing the final processing result.

16. The computer-implemented method of claim 12, further comprising:

receiving a compute request from a client, wherein the compute request includes the requested processing timeframe.

17. The computer-implemented method of claim 16, wherein the client is a consumer computing device, a host system, or an embedded system.

18. The computer-implemented method of claim 12, further comprising:

evaluating the one or more operational parameters using at least one predetermined threshold to determine that only a portion of the compute operation is completable within the requested processing timeframe.

19. The computer-implemented method of claim 12, wherein the operational parameters include:

a storage processing load;

a processing unit load;

a cache level;

a hardware capability;

a garbage collection load;

a memory state; and/or a processing queue level.

20. A system, comprising:

means for executing a state machine to monitor one or more operational parameters of a storage device;

means for evaluating, based on the one or more operational parameters from the state machine, a processing capability of the storage device;

means for determining, based on the processing capability of the storage device and compute requirements of a compute operation, only a portion of the compute operation is completable by the storage device within a requested processing timeframe;

means for executing, by the storage device, the portion of the compute operations;

means for determining, based on the executed portion of the compute operation within the requested processing timeframe, an intermediate result;

means for providing the intermediate result;

means for determining, based on the intermediate result, to unroll the compute operation;

means for cancelling the compute operation; and means for unrolling changes from executing the executed portion of the compute operation.

* * * * *